United States Patent [19]
Murata et al.

[11] Patent Number: 5,627,587
[45] Date of Patent: May 6, 1997

[54] SOLID-STATE CAMERA IN WHICH A REMOVABLE SOLID STATE MEMORY HAVING A BACKUP BATTERY IS USED AS AN IMAGE RECORDING DEVICE

[75] Inventors: Yoshitaka Murata, Kanagawa-ken; Kan Takaiwa, Tokyo; Hiroyuki Horii, Kanagawa-ken, all of Japan

[73] Assignee: Canon Kabushiki Kaisha, Tokyo, Japan

[21] Appl. No.: 355,803

[22] Filed: Dec. 14, 1994

Related U.S. Application Data

[63] Continuation of Ser. No. 228,922, Apr. 18, 1994, abandoned, which is a continuation of Ser. No. 97,943, Jul. 26, 1993, abandoned, which is a continuation of Ser. No. 975,901, Nov. 10, 1992, abandoned, which is a continuation of Ser. No. 483,352, Feb. 22, 1990, abandoned.

[30] Foreign Application Priority Data

Mar. 2, 1989 [JP] Japan .................................. 1-050528

[51] Int. Cl.⁶ ............................................... H04N 5/225
[52] U.S. Cl. .......................... 348/207; 348/233; 348/231; 348/373
[58] Field of Search ........................ 348/207, 220, 348/222, 231, 232, 233, 257, 372, 373, 374, 375, 376, 909.1; 358/906, 335; 360/96.5, 96.6; 361/212, 220, 399, 326, 296; 354/21, 217, 218, 430; H04N 5/225

[56] References Cited

U.S. PATENT DOCUMENTS

| | | |
|---|---|---|
| 4,489,351 | 12/1984 | d'Alayer de Costemore d'Arc ............. 358/213 |
| 4,772,117 | 9/1988 | Matsui ..................................... 354/402 |
| 4,820,186 | 4/1989 | Fujii ......................................... 439/326 |
| 4,837,628 | 6/1989 | Sasaki ..................................... 358/209 |
| 4,887,161 | 12/1989 | Watanabe et al. ....................... 358/224 |
| 4,890,166 | 12/1989 | Kimura et al. ....................... 358/909 X |
| 4,907,231 | 3/1990 | Watanabe et al. ........................ 371/24 |
| 4,943,867 | 7/1990 | Suetaka et al. ........................ 358/342 |
| 4,965,462 | 10/1990 | Crawford .................................. 307/66 |
| 5,034,804 | 7/1991 | Sasaki et al. ............................. 358/41 |
| 5,159,458 | 10/1992 | Murata et al. ....................... 358/909 X |

FOREIGN PATENT DOCUMENTS

| | | | |
|---|---|---|---|
| 2478883 | 9/1981 | France ............................. H01R 9/09 |
| 0017274 | 1/1982 | Japan .............................. H04N 5/26 |

*Primary Examiner*—Victor R. Kostak
*Assistant Examiner*—Nathan J. Flynn
*Attorney, Agent, or Firm*—Robin, Blecker, Daley & Driscoll

[57] ABSTRACT

A solid-state camera of the type which uses a solid-state memory as an image recording device. The solid-state camera includes an examining circuit for examining whether image recording is possible in response to a first stage of a release operation, and a control circuit for executing a predetermined warning operation in response to the output of the examining circuit. The solid-state camera is arranged to effect recording on the solid-state memory in a second stage of the aforesaid release operation.

18 Claims, 6 Drawing Sheets

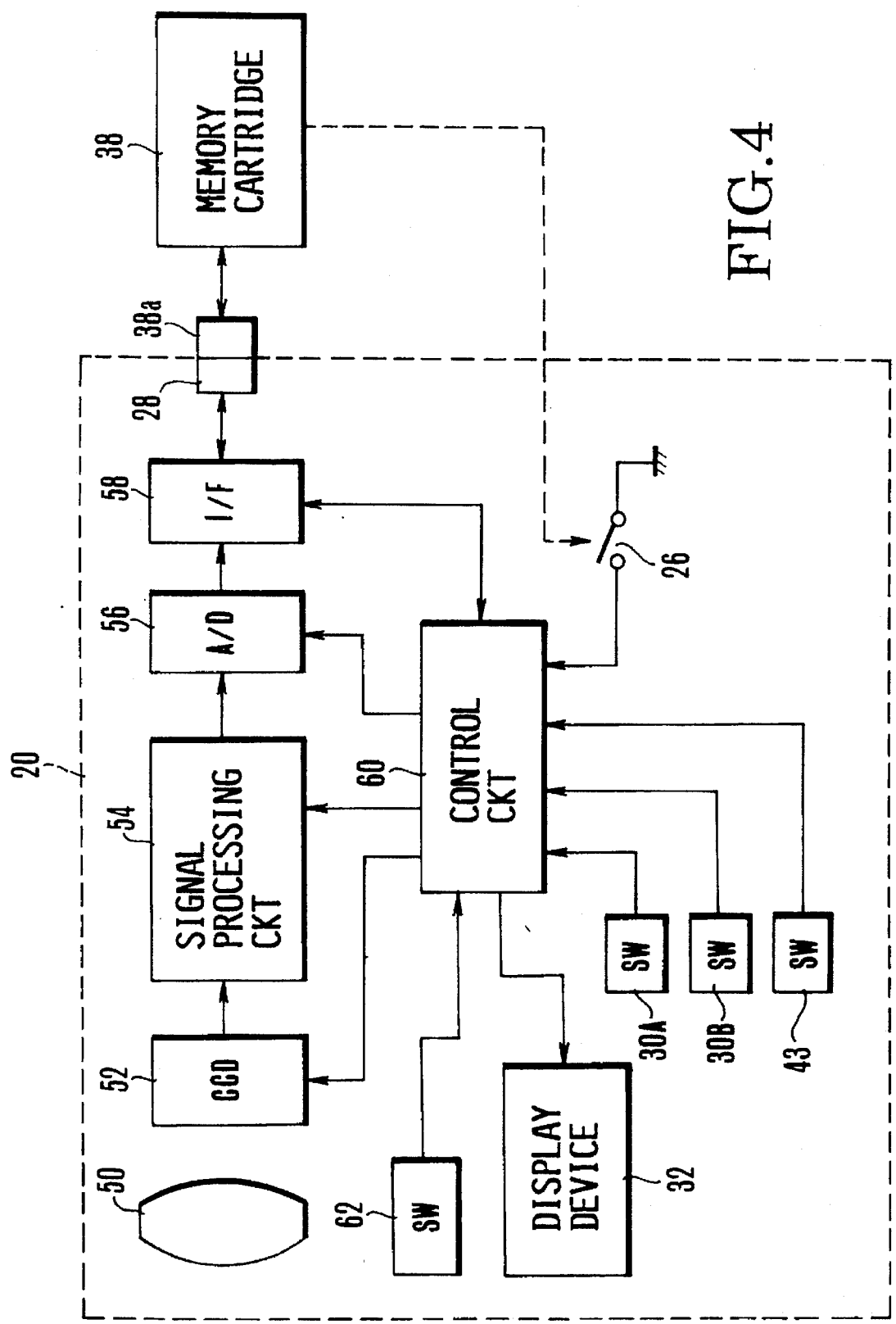

SOLID-STATE CAMERA IN WHICH A REMOVABLE SOLID STATE MEMORY HAVING A BACKUP BATTERY IS USED AS AN IMAGE RECORDING DEVICE

This is a continuation application under 37 CFR 1.62 of prior application Ser. No. 08/228,922, filed Apr. 18, 1994, now abandoned, which is a continuation of Ser. No. 08/097,943, filed Jul. 26, 1993 (now abandoned), which is a continuation of Ser. No. 07/975,901, filed Nov. 10, 1992 (now abandoned), which is a continuation of Ser. No. 07/483,352, filed Feb. 22, 1990 (now abandoned).

BACKGROUND OF THE INVENTION

1. Field of the Invention

The present invention relates to a solid-state camera of the type which uses a solid-state memory as a recording medium for storing photographed images.

2. Description of the Related Art

Electronic still cameras of the type which require no moving mechanism as a means for recording/reproducing information (hereinafter referred to as "solid-state cameras") have recently received special attention in the field of cameras belonging to a generation which follows silver-salt type still cameras and video-floppy-disk type electronic still cameras. Electronic still cameras electronically handle image information, thereby facilitating real-time reproduction of a recorded image, transmission of images, computer-aided processing of images, electronic filing of images and the like. However, since such an electronic still camera employs as a recording medium a small magnetic sheet called a video floppy disk, it requires a moving part, such as a head loading mechanism, for positioning a magnetic head at an accuracy of some tens of microns to several hundred microns in track pitch. The necessity of moving parts of this kind leads to an increase in the manufacturing cost of cameras and also imposes limitations on use environments, operating speeds or the like. Similar problems are experienced with other recording media such as optical disks or opto-magnetic disks.

Solid-state cameras have been proposed in order to solve the above-described problems. FIG. 1 shows in schematic form the construction and arrangement of such a solid-state camera system. The illustrated solid-state camera system comprises a camera body 10, a memory cartridge 12 removably attached to the camera body 10 for storing image information, and a reproduction device 14 for reproducing information stored in the memory cartridge 12. The memory cartridge 12 comprises an IC memory device, a memory control circuit, and an electrical backup power source therefor. Connection between the memory cartridge 12 and the camera body 10 may be made by means of an ordinary metallic connector, a transmit coil, an optical coupler or the like. An image, photographed in the camera body 10, is stored in the memory cartridge 12 in a predetermined format. If the memory cartridge 12 is connected to the reproduction device 14 to store the stored image, electronic image data can be transmitted from the reproduction device 14 to a television monitor, a printer, a transmitter, a filing device or the like.

In the above-described conventional solid-state camera, since the memory cartridge 12 is removable from the camera body 10, perfect communication between the memory cartridge 12 and the camera body 10 must be assured. In addition, the memory cartridge 12 itself must not include an imperfect circuit or an electrical backup power source having an insufficient capacity. If a user actuates a release button without noting such an imperfection, no photographed image will be recorded and the photography will fail.

SUMMARY OF THE INVENTION

It is therefore an object of the present invention to provide a solid-state camera capable of automatically examining the presence or absence of the aforesaid failures such as imperfect communication, the imperfect operation of a circuit and an insufficiency in the capacity of an electrical backup power source, and of providing an indication or warning thereof as required.

To achieve the above object, in one illustrative embodiment of the present invention, a solid-state camera of the type which uses a solid-state memory as an image recording means, comprises: examining means for examining whether image recording is possible in response to a first stage of a release operation; and control means for executing a predetermined warning operation in response to the output of the examining means. The solid-state camera is arranged to effect recording on the solid-state memory in a second stage of the aforesaid release operation.

The above arrangement makes it possible to detect, immediately before photography, whether a photographed image can be recorded on the solid-state memory. On the basis of the result of the detection, the corresponding warning or other required indications are displayed and the required control, such as inhibition of photography, is executed. This arrangement improves the ease of operation and the extent of comfort during use.

Further objects, features and advantages of the present invention will become apparent from the following detailed description of an embodiment of the present invention with reference to the accompanying drawings.

BRIEF DESCRIPTION OF THE DRAWINGS

FIG. 4 is a circuit diagram showing the electrical circuit of the embodiment;

DETAILED DESCRIPTION OF THE PREFERRED EMBODIMENT

A preferred embodiment of the present invention will be described in detail below with reference to the accompanying drawings.

Figure 1:
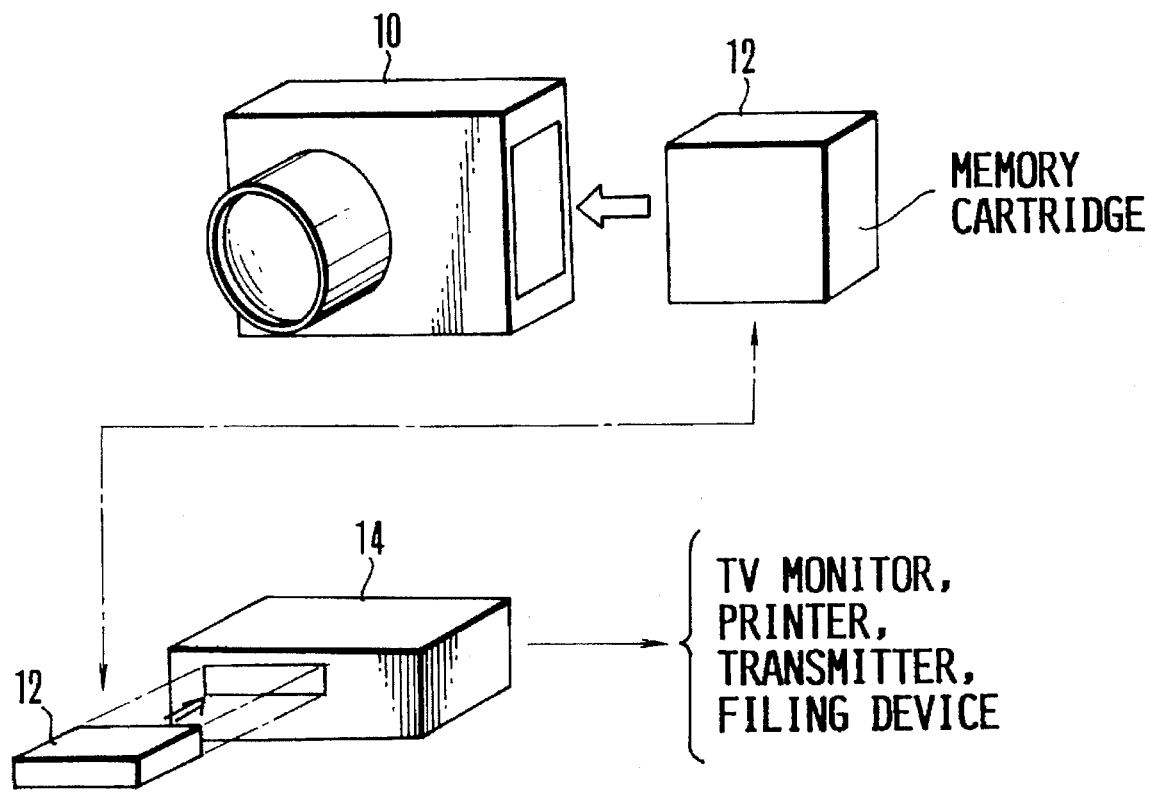
FIG. 1 is a schematic view showing a conventional type of system arrangement.
Figure 2:
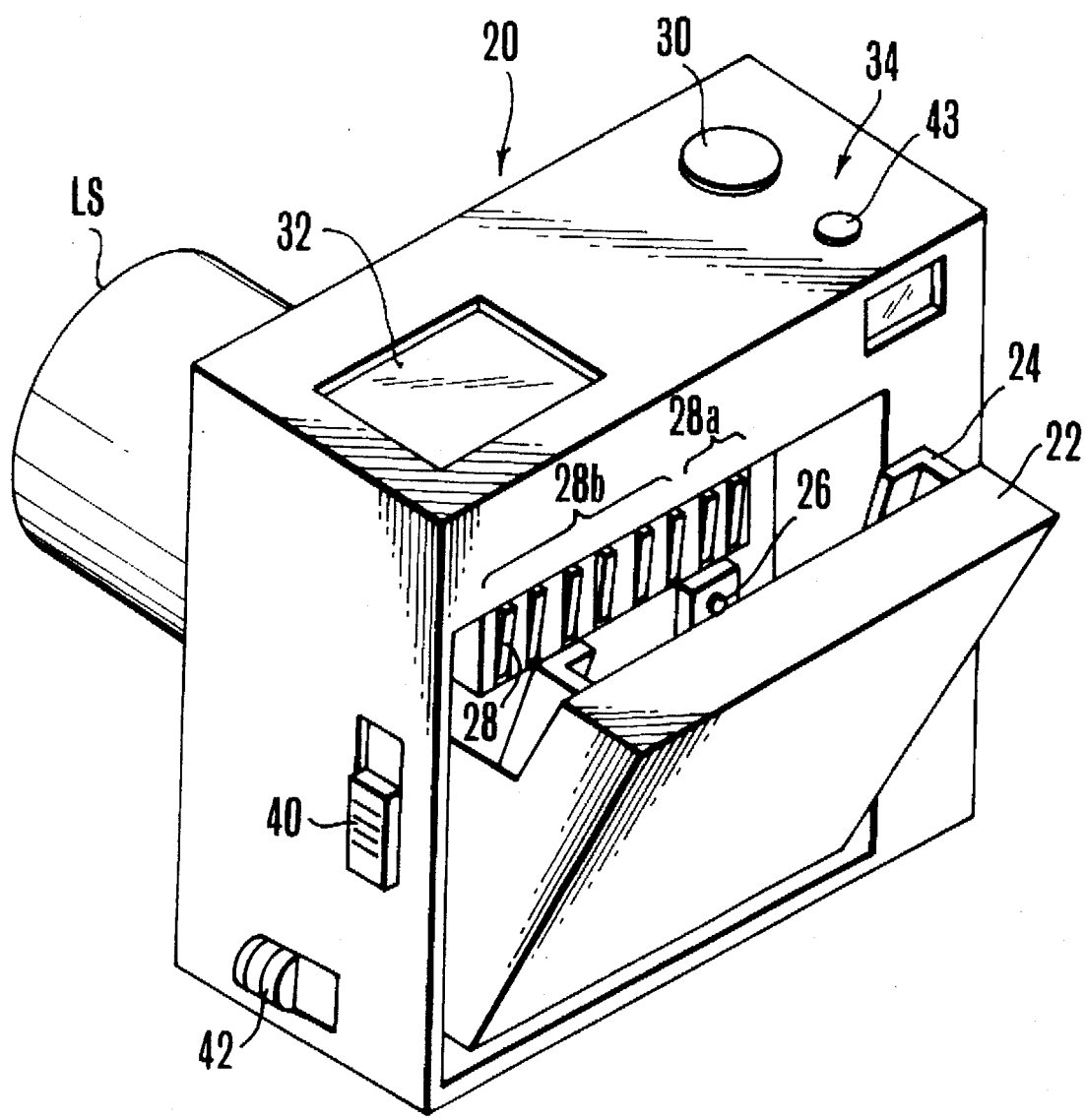
FIG. 2 is a diagrammatic perspective view showing one embodiment of the present invention.
Figure 3B:
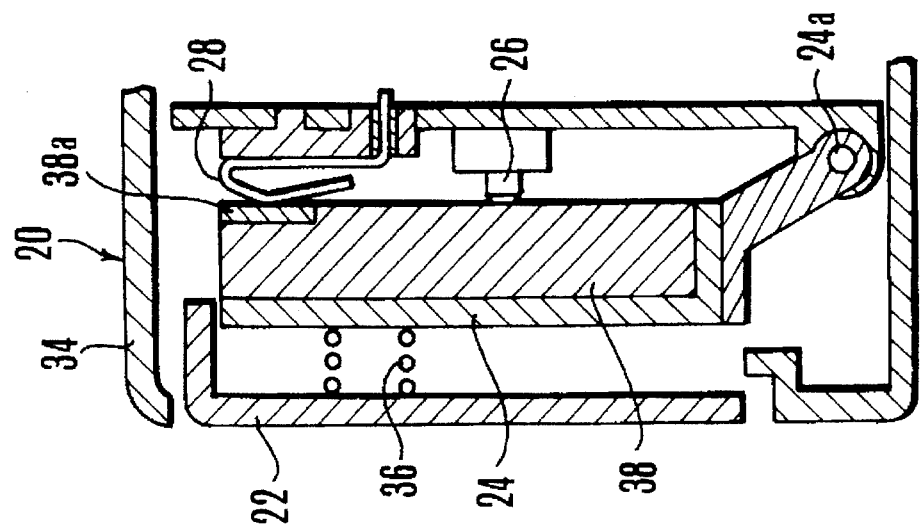
FIG. 3B is a diagrammatic cross-sectional view showing the embodiment with a memory cartridge loaded therein.
Figure 3A:
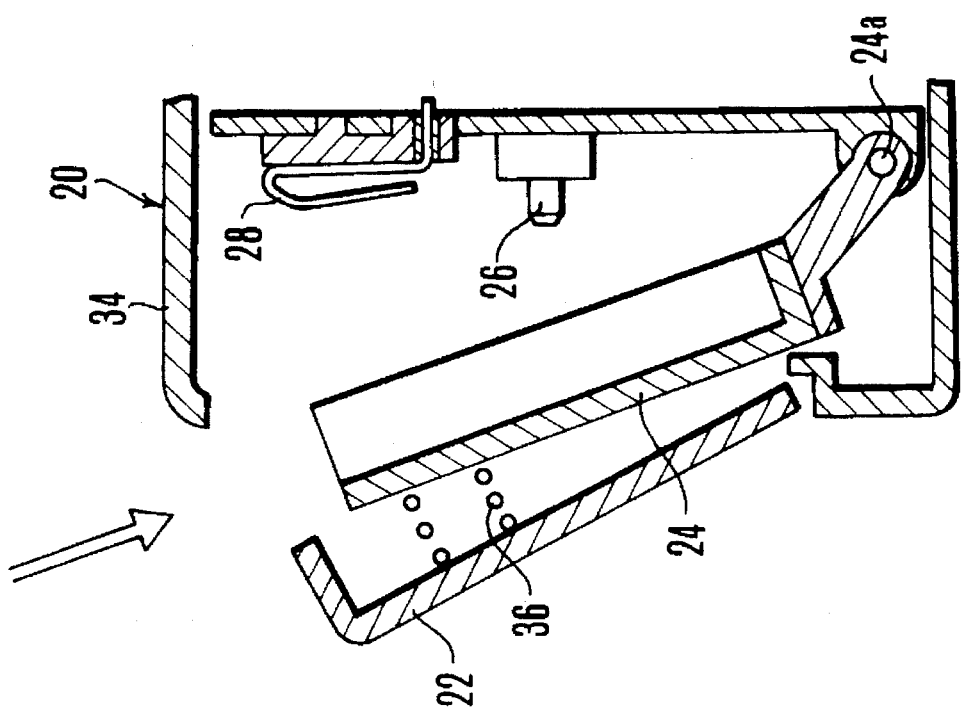
FIG. 3A is a diagrammatic cross-sectional view showing the embodiment with a memory-cartridge receiving portion in its open position.

Referring to FIGS. 2, 3A and 3B, the illustrated camera comprises the following major elements: a lens LS; a camera body 20; a back cover 22; a cartridge holder 24 disposed for pivotal motion about a pivot axis 24a; a loading sensor switch 26; an array of electrical contacts 28 for providing communication between the memory cartridge and the camera body 20; a release button 30; a liquid crystal display (LCD) device 32; a cover member 34; a compression coil 36 for biasing the back cover 22; a memory cartridge 38 provided with a memory contact 38a; an ejection button 40 for ejecting the memory cartridge 38; a power switch 42 for the camera body 20; and an external testing switch 43.

The operation of each element will be explained below. When photography is started, the ejection button 40 is actuated to open the back cover 22 as shown in FIG. 3A, and the memory cartridge 38 is inserted into the holder 24 in the direction indicated by the arrow of FIG. 3A. If the memory cartridge 38 is provided with a barrier shutter for contact protection, the barrier shutter is opened by an opening means (not shown) during insertion of the memory cartridge 38. When the memory cartridge 38 reaches a predetermined lower position in the holder 24, the memory cartridge 38 is secured by a lock mechanism (not shown). Thereafter, the back cover 22 is closed and, as shown in FIG. 3B, the memory contact 38a is electrically connected to the array of electrical contacts 28 of the camera body 20. When the insertion is completed, the loading sensor switch 26 operates to cause a back cover lock mechanism (not shown) to hold the state of FIG. 3B.

FIG. 4 is a block diagram showing the electrical circuit of the embodiment. In FIG. 4, the same reference numerals are used to denote the same elements as those shown in FIGS. 2, 3A and 3B. The illustrated electrical circuit includes the following parts: a first-stroke switch 30A arranged to be closed when the release button 30 is pressed by a first stroke; a second-stroke switch 30B arranged to be closed when the release button 30 is pressed by a second stroke; a photographic lens 50; an image sensor 52 such as a CCD; a signal processing circuit 54; an A/D converter 56; an interface circuit 58 for connection to the memory cartridge 38; a control circuit 60 for controlling all the elements, made of a microcomputer; and a switch 62 for issuing various kinds of commands.

The image sensor 52 converts into an electrical signal the optical image of a subject which is formed by the photographic lens 50. The signal processing circuit 54 applies a predetermined video signal processing to the electrical signal. The A/D converter 56 digitizes the output of the signal processing circuit 54, and the digital output is supplied to the memory cartridge 38 through the interface circuit 58 and the contacts 28 and 38a so that it is stored in the memory cartridge 38.

Although the details of the control circuit 60 will be explained later, when the first-stroke switch 30A of the release button 30 is closed, the control circuit 60 checks the electrical capacity of the camera body 20 and the capacity of a backup battery for the connected memory cartridge 38. In the case of a predetermined state in which photography is impossible, the control circuit 60 issues a warning to bring the photographic operation to a halt. When the external testing switch 43 is actuated, the control circuit 60 checks the same items and displays the result on the display device 32. The memory cartridge 38 may include a memory made from, for example, semiconductor memory.

Figure 5:
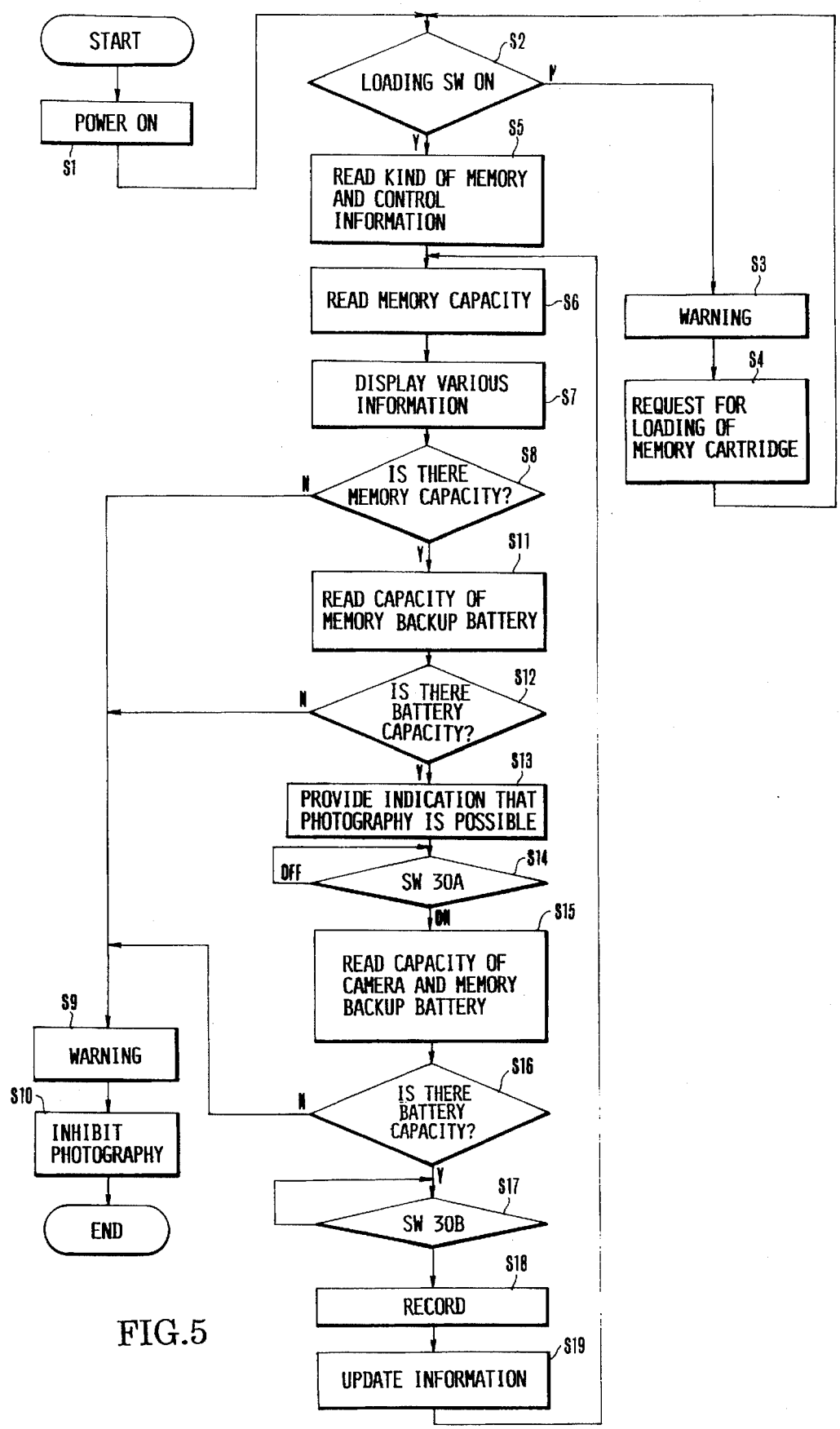
FIG. 5 is a flowchart showing the operation of the embodiment.
Figure 6:
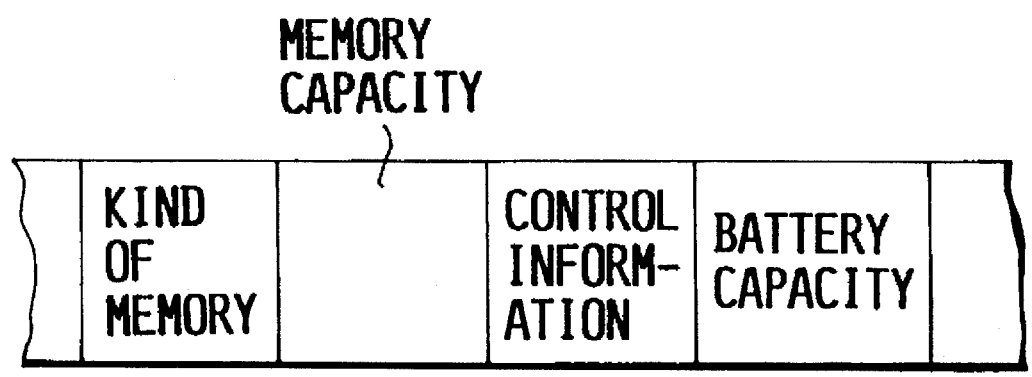
FIG. 6 is a view showing the contents of communication data by way of example.

FIG. 5 is a flowchart showing the operation of the above-described embodiment. When the power switch 42 is actuated to supply electric power (Step S1), the control circuit 60 examines whether the loading sensor switch 26 is open or closed (Step S2). If the memory cartridge 38 is not loaded (or it is imperfectly loaded), the control circuit 60 provides a warning on the display device 32 and/or a sound (Step S3) and requests the user to load the memory cartridge 38 (Step S4). If the memory cartridge 38 is loaded, the control circuit 60 reads various kinds of information on the loaded memory cartridge 38 (Steps S5 and S6) and displays the read information on the display device 32 (Step S7). FIG. 6 shows the contents of communication data transmitted from the memory cartridge 38 to the camera body 20. The communication data is temporarily stored in the memory of the memory cartridge 38.

If the memory capacity is full, the control circuit 60 displays on the display device 32 a warning which indicates that no further photography is possible (Step S9), and inhibits the photography (Step S10). If the required amount of memory capacity remains, the control circuit 60 reads the remaining capacity of the backup battery of the memory cartridge 38 (Step S11). If the battery capacity is below a predetermined value, the control circuit 60 displays on the display device 32 an indication that no further photography is possible (Steps S9 and S10). If the battery capacity is above the predetermined value, the control circuit 60 displays on the display device 32 an indication that further photography is possible (Step S13), and waits for a release operation to be performed.

When the switch 30A is closed in the first stroke of the release button 30 (Step S14), the control circuit 60 reads the electrical capacities of the camera body 20 and the memory cartridge 38 (Step S15). If the battery capacity is insufficient, the control circuit 60 provides an indication that no photography is possible, and inhibits the photography (Steps S9 and S10). If the battery capacity is sufficient, the control circuit 60 waits for the second-stroke switch 30B to be closed (Step S17). When the second-stroke switch 30B is closed, the control circuit 60 carries out photography and records the obtained image signal on the memory cartridge 38 (Step S18) for storing purposes. After the recording (Step S18), the control circuit 60 updates information such as the number of exposed frames, the remaining memory capacity and the like (Step S19) and returns to Step S6. In Step S6, the control circuit 60 checks the remaining memory capacity and the remaining capacity of the backup battery, waiting for the next release.

Immediately after the power switch 42 has been turned on, the control circuit 60 may be adapted to establish direct communication with the memory cartridge 38 without examining whether the loading sensor switch 26 is open or closed. If communication is impossible, the control circuit 60 may be adapted to provide a warning indicating that the memory cartridge 38 is not loaded or imperfectly loaded, and may inhibit the photography.

Although, in the above embodiment, the loading sensor switch 26 is separately provided for detecting whether the memory cartridge 38 is completely loaded, a part of the electrical contacts 28 may be utilized for loading sensing. In this arrangement, for example, from among the electrical contacts 28, two contacts 28a and the remaining contacts 28b may be assigned to loading sensing and communication, respectively. Either of the contacts 28a for loading sensing may be grounded. When the memory card 38 is loaded, the memory contact 38a is electrically connected to the electrical contacts 28. The control circuit 60 determines whether the loading is completed by detecting whether or not the electrical signal (voltage value or current value) input from the contact 28a is high or low compared to a predetermined level.

Of course, all the electrical contacts 28 may be used for loading sensing and communication so that loading sensing and data communication can be performed at different timings. In this arrangement, the number of contacts 28 and 28a can be reduced.

As can be readily understood from the foregoing, according to the present invention, each time one photographic cycle is performed, it is determined whether or not an image signal can be recorded in the solid-state memory and also whether or not a recorded image can be held. Accordingly, it is possible to prevent users from failing in photography or losing a recorded image due to troubles such as an insufficiency in the battery capacity of the solid-state memory.

While the present invention has been described with respect to what is presently considered to be the preferred embodiment, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A solid-state camera in which a removable solid-state memory having a backup battery is used as an image recording means, comprising:

detecting means for detecting said backup battery does not have a predetermined remaining power before a recording operation starts; and control means for inhibiting said recording operation in response to an output of said detecting means, said solid-state camera being arranged to effect recording on said solid-state memory in response to an operation of a release operating member, said detecting means being further operative for detecting the loading of said solid-state memory on said solid-state camera and a condition of the backup battery by effecting communication with said solid-state memory.

2. A solid-state camera according to claim 1, wherein said solid-state memory includes a semiconductor memory.

3. An image pickup apparatus having a removable memory unit comprising:

(a) image pickup means for producing an image signal;

(b) two-stroke release switch for starting an image pickup operation by a first stroke and for starting a recording operation by a second stroke; and (c) control means for checking a condition of said removable memory unit in said first stroke of said two-stroke release switch and for inhibiting said recording operation when said condition of said removable memory unit is not proper.

4. A solid-state camera according to claim 1, wherein said detecting means also detects the remaining electrical capacity of said solid-state memory.

5. A camera system comprising:

a) a camera unit including image-sensing means;

b) a recording unit for recording an output of said image-sensing means, said recording unit having a backup power source and being removably attached to said camera unit, and said recording unit being arranged to be in its standby state in a first stage operation of a release operating member and to execute a recording operation in a second stage operation of the release operating member;

c) detecting means for detecting the power level of said backup power source by effecting data communication with said recording unit before said second stage of said release operating member, when said recording unit is attached to said camera unit; and d) inhibit means for inhibiting a recording operation of said recording unit in response to a detecting result of said detecting means.

6. A camera system according to claim 5, wherein said recording unit includes a semiconductor memory.

7. A camera system according to claim 6, wherein said backup power source holds the contents stored in said semiconductor memory.

8. A camera system according to claim 5, wherein said detecting means includes communication means for allowing communication between said recording unit and said camera unit.

9. A camera system according to claim 5, wherein said detecting means is capable of detecting the remaining recording capacity of said recording unit.

10. A camera system according to claim 9, wherein said inhibit means controls the recording operation of said recording unit in response to said remaining recording capacity.

11. A solid-state camera comprising:

a) a camera unit having a release switch arranged to effect a recording operation in response to an operation of a release operating member;

b) a solid-state memory unit removably attachable to said camera unit and having a backup battery;

c) examining means for examining whether said solid-state memory unit is loaded into said camera unit or not by effecting communication between said solid-state memory unit and said camera unit, said examining means being further operative to examine whether a backup battery power is sufficient or not by effecting communication between said solid-state memory unit and the camera unit before said release operating member is operated; and d) inhibit means for inhibiting a recording operation when said examining means detects said backup power is not sufficient.

12. A solid-state camera according to claim 11, wherein said solid-state memory includes a semiconductor memory.

13. A solid-state camera comprising:

a) a camera unit having a release switch arranged to effect a recording operation in response to an operation of a release operating member;

b) a solid-state memory unit having a backup battery removably attachable to said camera unit;

c) loading detecting means for detecting whether said solid-state memory unit is loaded into said camera unit or not by effecting mutual communication between said solid-state memory unit and said camera unit;

d) remaining backup battery capacity detecting means for detecting whether or not said solid-state memory unit can be backed up by the battery before the release operating member is operated, in response to an output of said loading detecting means; and e) inhibit means for inhibiting the recording operation when said detecting means detects said solid-state memory cannot be backed-up by the battery.

14. A solid-state camera according to claim 13, further comprising prohibiting means for prohibiting recording on said solid-state memory in response to the output of said loading detecting means.

15. A camera system comprising:

a) a camera unit including image-sensing means;

b) a memory unit removably attachable to said camera unit through electrical contact and having a backup battery;

c) detecting means for detecting a condition of said backup battery by communicating with said memory unit through the electrical contact; and d) inhibit means for inhibiting a recording operation of an output of said image-sensing means when said detecting means detects said backup battery cannot backup said memory unit.

16. The camera system according to claim 15, wherein said detecting means is arranged to further detect a storage capacity of said memory through said contact.

17. The camera system according to claim 15, wherein said detecting means is arranged to detect whether said memory unit is attached to the camera unit through said contact.

18. An image recording memory unit detachable to a camera body comprising:

(a) semiconductor memory circuits for storing an image data transmitted from said camera body;

(b) backup battery for backup said memory circuit; and (c) transmit means for transmitting as a digital data to said camera body at least a condition of said backup battery.

* * * * *